3,412,030
PROCESS OF MELTING SNOW AND ICE
Nils Gösta Wahlberg, Ornskoldsvik, Sweden, assignor to Mooch Domsjo Aktiebolag, Ornskoldsvik, Sweden, a limited company of Sweden
No Drawing. Continuation-in-part of application Ser. No. 208,563, July 9, 1962. This application Jan. 27, 1965, Ser. No. 428,548
Claims priority, application Sweden, July 10, 1961, 7,142/61
4 Claims. (Cl. 252—70)

This invention relates to a process of melting snow and ice and more particularly to a method of treating snow and ice in order to induce more rapid melting. This application is a continuation in part of application Ser. No. 208,563, filed July 9, 1962, now abandoned.

In northern climates, and particularly those where the summer season is rather short, it is important that the snow cover laid down during the winter be melted off as quickly as possible. Under normal weather conditions, thawing is effected by rain and strong sunshine. Thus, if dry, cloudy weather prevails, thawing may be greatly delayed.

In accordance with the invention, it has been determined that the rate of thawing or melting of snow and ice can be greatly accelerated by applying a water-soluble organic wetting agent to the snow or ice surface.

The wetting agent may be applied either in solid or liquid form, directly, or in the form of an aqueous solution. In the former case, it will dissolve in the snow or ice or in a film of water on the surface of the ice or snow, upon partial thawing. In either case, the thawing is greatly accelerated by even small amounts of the wetting agent, as compared, for example, to the rate of thawing upon no application of water alone.

The amount of wetting agent that is applied is in no way critical. Amounts as low as 0.01 gram per square yard of snow or ice surface effect a marked increase in the rate of thawing. Preferably, at least 0.03 gram is applied per square yard. Optimum thawing rates are obtained employing amounts within the range from about 1 to about 30 grams per square yard.

Any method of application that is convenient can be employed. The wetting agent should be distributed uniformly, if at all possible. If the wetting agent is employed per se, a solid wetting agent can be applied by dusting, and a liquid wetting agent can be distributed uniformly over the surface by spraying. Aqueous solutions of wetting agent normally are applied by spraying. It is preferable to add the wetting agent in solid form, since thereby an unnecessary carrying of water is avoided.

The accelerated thawing is obtained by water-soluble organic wetting agents as a class, and is apparently to be ascribed to the wetting or surface-active properties of the wetting agent. The ionic charge of the agent is unimportant. Any water-soluble anionic, cationic and nonionic wetting agents can be employed. By "water-soluble," it is meant that the agent is soluble in water in the amount employed for the volume of snow or applying solution.

The following are exemplary of useful wetting agents.

The alkyl aryl sulfonates are a class of anionic wetting agents well known in the art under this name. One example thereof is sodium dodecyl benzene sulfonate. Another example is the sulfonated phenyl polypropylene alkanes characterized by the branched chain structure of polypropylene and tertiary alkyl carbon at the benzene ring, and having the following general structure:

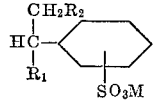

where M is hydrogen, an alkali metal, ammonium, or an organic amine cation, $R_1$ and $R_2$ are alkyl, of the type formula $C_nH_{2n+1}$, and at least one R is a polypropylene group, the whole alkyl group containing preferably 12 to 15 carbon atoms. These are known compounds, whose preparation and properties are set forth in U.S. Patent No. 2,477,383, to Lewis, issued July 26, 1949; they are available in commerce under the trade names "Oronite," "Ultrawet," and "Neolene."

Other water-soluble alkyl aromatic sulfonic acids include those prepared by alkylating benzene or naphthalene with a kerosene fraction, followed by sulfonation to aromatic sulfonic acids, such as sodium keryl benzene sulfonate.

Another class of useful wetting agents are the amidoalkane sulfonates, which are characterized by the following structure:

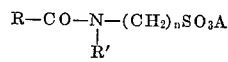

where A is hydrogen or an alkali metal, i.e., ammonium, sodium or potassium, $n$ is a small whole number from 1 to about 5, preferably 2 or 3, R' is hydrogen or an alkyl aryl, or cycloaliphatic group, such as methyl, and R is an alkyl or alkylene radical, such as myristyl, palmityl, oleyl and stearyl. Sodium palmitic tauride, sodium palmitic methyl tauride, sodium myristic methyl tauride, sodium palmiticstearic methyl tauride and sodium palmitic methyl amidopropane sulfonate are typical examples thereof.

These compounds are prepared by interacting the corresponding aliphatic acid anhydride or halide with an organic aliphatic aminosulfonic acid, such as taurine, $NH_2CH_2CH_2SO_3H$, and various N-substituted taurines, such as N-methyl taurine or aminopropane sulfonic acid, $NH_2(CH_2)_3SO_3H$.

Other anionic wetting agents include esters of sulfuric acid with aliphatic alcohols of 10 to 18 carbon atoms, particularly oleic acid, tall oil, turkey red oil, and acids derived by the reduction of the fatty acids derived from coconut oil, palm oil, sperm oil and the like long-chain fatty acids, sulfonated castor oil, esters and ethers of isethionic acid, long-chain fatty acid esters and long-chain alkyl ethers of 2,3-dihydroxy-propane sulfonic acid and sulfuric acid esters of monoglycerides and glycerol monoethers.

Examples of organic nonionic wetting agents include alkyl oxyether and ester and thioether and esters having the following general formula:

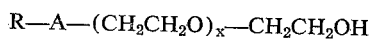

where R is a straight or branched chain saturated or unsaturated hydrocarbon group having from 8 to 18 carbon atoms, or an aralkyl group having a straight or branched chain saturated or unsaturated hydrocarbon group of from 8 to 18 carbon atoms attached to the aryl nucleus, and attached to A through the aryl nucleus, A is selected from the group consisting of ethereal oxygen and sulfur, amino, carboxylic ester and thiocarboxylic ester groups and $x$ is a number from 8 to 20. R can, for example, be a straight or branched chain alkyl group, such as octyl, nonyl, decyl, lauryl, myristyl, cetyl, or stearyl, or an alkylaryl group such as octylphenyl, nonylphenyl, decylphenyl, stearylphenyl, etc.

The sulfated ethoxylated derivatives of the above also are useful anionic wetting agents:

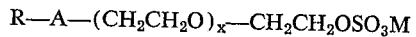

where M is hydrogen or an alkali metal or an organic amine-cation and $x$, A and R are as above.

Where R is alkyl it will be evident that the wetting agent can be regarded as derived from an alcohol, mercaptan, amine, oxy or thio fatty acid of high molecular weight, by condensation with ethylene oxide. Typical of this type of alkyl product are the condensation products of oleyl or lauryl (dodecyl) alcohol, mercaptan, or amine, or oleic or lauric acid, with from 8 to 17 moles of ethylene oxide, such as "Emulfor ON." Typical alkyl esters are "Renex" (polyoxyethylene ester of tall oil acids) and "Neutronyl 331" (higher fatty acid ester of polyethylene glycol).

Where R is aralkyl, the wetting agent can be derived from an alkyl phenol or thiophenol.

The ethoxylated alkyl phenols and thiophenols have the following general formula:

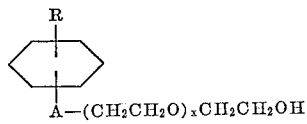

where R is a straight or vranched chain saturated or unsaturated hydrocarbon group having at least 8 carbon atoms up to approximately 18 carbon atoms, A is oxygen or sulfur, $x$ is a number from 8 to 20. R can, for example, be a straight or branched chain octyl, nonyl, decyl, lauryl, cetyl, myristyl or stearyl group. Typical are the condensation products of octyl and nonyl phenol and thiophenol with from 8 to 17 moles of ethylene oxide, available commercially under the trade name "Igepal CA."

Also useful are the poly-1,2-alkylene oxide wetting agents described and claimed in U.S. Patents No. 2,674,619 to Lundsted, dated Apr. 6, 1954, and No. 2,677,700 to Jackson et al., dated May 4, 1954. These are condensates of 1,2-alkylene oxides, such as 1,2-propylene oxide or 1,2-butylene oxide, alone or in admixture, and such mixtures can also include ethylene oxide, such as the polyoxypropylene-oxyethylene condensates, the ethylene oxide residues constituting from 20 to 90% of the resulting condensate.

These condensates conform to one of the following two type formulae:

$$Y[(C_3H_6O)_n—E—H]_3$$

where Y is the residue of an organic compound containing therein $x$ active hydrogen atoms, $n$ is an integer, $x$ is an integer greater than 1; the values of $n$ and $x$ are such that the molecular weight of the compound, exclusive of E, is at least 900, as determined by hydroxyl number; E is a polyoxyalkylene chain wherein the oxygen/carbon atom ratio is at least 0.5, and E constitutes 20–90%, by weight, of the compound:

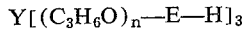

wherein Y is the residue of an organic compound containing therein a single hydrogen atom capable of reacting with a 1,2 alkylene oxide; $R_1$, $R_2$, $R_3$ and $R_4$ are selected from the group consisting of hydrogen-aliphatic radicals and aromatic radicals, at least one such substituent being a radical other than hydrogen; $n$ is greater than 6.4 as determined by hydroxyl number, and X is a water-solubilizing group.

Typical cationic wetting agents are the higher fatty acid esters of hydroxy amide quaternary salts, such as the lauric ester of N(β-hydroxyethyl-α-chloropyridinium) acetamide, the quaternary ammonium salt type, such as triamylbutyl ammonium cymene sulfonate, cetyl pyridinium bromide, oleyl pyridinium chloride, dimethyl phenyl benzyl ammonium salt of dibutyl-naphthalene sulfonic acid, trimethyl heptyl amomnium salt of sulfated butyl oleate, octadecyl trimethyl ammonium chloride, straight chain fatty amines of eight to eighteen carbon atoms, such as stearylamine, dilauryl amine, lauryl di(hydroxy ethyl) amine, the polyamines made from the reduction of polymerized unsaturated fatty nitriles, i.e., the polymerized nitrile of linseed oil fatty acids, and the quaternary compounds from alkyl halides and hexamethylene tetramine, the reaction products of α-halogenated fatty acid anilides or esters such as α-chloro-stearic anilide or α-bromo-stearic ethyl ester with tertiary amines such as trimethyl amine, reaction products of long chain alkyl phenols with amines and aldehydes, such as the reaction product of p-t-octylphenol with formaldehyde and dimethylamine, which products may also be quaternized, such as

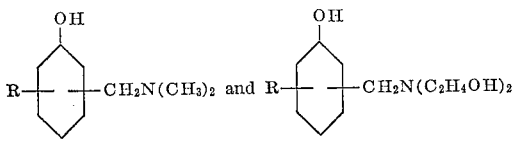

where R is an alkyl group of six to eighteen carbon atoms, the amidoalkylene amines $RCONHCH_2CH_2N—R_1R_2$ where R is an alkyl group of six to eighteen carbon atoms, and $R_1$ and $R_2$ are alkyl or hydroxyalkyl groups of one to five carbon atoms (the Sapamines), the amidoalkylene quaternary ammonium salts

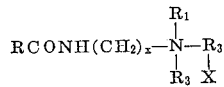

wnere R is as above, $R_1$, $R_2$ and $R_3$ are alkyl or aryl or alkaryl, and X is an anion such as halide, alkyl ether amines of the type $ROCH_2NR_1R_2$ and their quaternary ammonium salts $ROCH_2NR_1R_2R_3X$ where R, $R_1$, $R_2$, $R_3$ and X are as above, the corresponding thio ethers $RSCH_2NR_1R_2$ and $RSCH_2NR_1R_2R_3X$, the long-chain alkyl sulfonium compounds of the type

where R, $R_1$, $R_2$ and X are as above; such as cetyl methyl ethyl sulfonium bromide, and amido sulfonium salts of the type

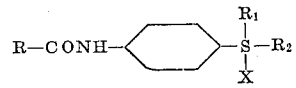

where R, $R_1$, $R_2$ and X are as above, and the Victamines

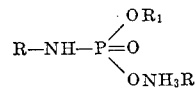

where R and $R_1$ are as above, such as that made from stearylamine and ethyl metaphosphate:

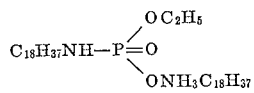

No apparent difference has been noted between water-soluble wetting agents which have detergent properties and those which do not, and both types can be employed in the invention.

It has been found that if a snow surface is sprayed with an aqueous solution of a water-soluble wetting agent, in accordance with the invention, the melting rate upon natural exposure to heat is greater than that of a snow surface otherwise identical but sprayed with the same amount of water without the addition of wetting agent. While the mechanism of this accelerated thawing has not as yet been fully elucidated, numerous experiments suggest that the following may be at least a partial explanation.

If one applies to the upper surface of a cube of snow a water-soluble wetting agent or an aqueous solution incorporating a wetting agent, the water film that is formed in the thaw surrounding the ice particles of the cube is so changed by the wetting agent as to have a lower surface tension. Consequently, the water more readily penetrates the cube, due to the wetting, and runs towards the bottom of the cube. Therefore, the density of the snow in the surface layer is reduced, due to escape of water, while the density in the inner part of the cube and toward its base is increased due to the entry of the water. The water that escapes into the cube is replaced by an equally large volume of air, drawn from the above-zero air surrounding the cube. This air is at a higher temperature than the air within the cube, and heat-exchange between the snow and this warmer air melts more snow. The cycle is repeated, with the water thus formed, so that a further amount of warm air is drawn into the mass of snow. In this way, thawing is accelerated.

Since the water melted from the surface treated with melting agent penetrates deep into the snow, this water is prevented from coming into contact with the warmer air to which the surface is exposed. Hence, heat that could be available for thawing is not wasted by evaporating the water at the surface.

If on the other hand one applies to a snow cube surface water that does not contain a water-soluble wetting agent, the behavior is exactly the opposite. Here, the water that is formed by thawing does not penetrate the snow as easily, because it does not wet the snow, due to the higher surface tension. Hence, this water does not penetrate into the interior of the cube, but remains on the surface, between the snow and the air, where it can absorb heat that might otherwise melt snow, and evaporate, to a much greater extent than in the case where the wetting agent is added. Some of the heat of evaporation also is taken from the snow surface, so that the snow is cooled by the evaporation, delaying its thawing, and in some cases even preventing it.

This experiment appears to confirm the above theory. If two glass beakers of the same size and same wall thickness are filled with equal amounts of snow of the same type, and the surface in the one case is treated with an aqueous solution of a water-soluble wetting agent, and the other only with water at the same temperature as the solution, the snow will melt, provided that the experiment is carried out in a room whose temperature is above 0° C. If the two beakers are compared, it will be found that water appears rather rapidly in the lower part of the beaker to which wetting agent has been added, but rather slowly at the bottom of the beaker which has not been treated with the wetting agent. The snow in the upper layer of the beaker to which the wetting agent has been added becomes dryer than the snow in the other beaker. This shows that the water in the first beaker has crept down towards the bottom in quite a different way. In the second beaker the water remains near the surface, and is dammed up by the snow, owing to capillary action in the small pores between the grains of snow. This can occur because of the relatively higher surface tension of the water. If one looks at the two snow surfaces from above, it can be clearly seen that the snow on the surface of the beaker to which no wetting agent has been added is wetter than the surface of the snow in the beaker which contains the wetting agent.

These experiments have been carried out employing as the wetting agent Berol Lanco, a water-soluble nonionic nonyl phenol-polyoxyethylene glycol condensate having a molecular weight of about 660, both indoors at a temperature of +22° C., and outdoors during a thaw. Both experiments gave the same results, and show that the melting of snow and ice was greatly accelerated by this wetting agent.

The following examples are illustrative of the method of the invention, and in the opinion of the inventor represent the best embodiments of his invention. The tests described were carried out in open agricultural land in northern Sweden.

EXAMPLE 1

On Mar. 29, 1961, five surfaces, each 60 meters in length and 1 meter in breadth, were marked out on flat ground in an open snow-covered field. The mean depth of snow in the field ranged from 36 to 43 cms. as noted in Table I, below. All surfaces were sprayed with the same volume of liquid, 12.5 liters, using a pressure spray gun which made it possible to apply the liquid to the surface uniformly and in finely distributed form. Surface No. 1 was sprayed with water. Surface No. 2 was sprayed with water containing 50 grams of Berol Lanco; thus, about 0.8 gram of this wetting agent was applied per square yard. To Surface No. 3 was applied water containing 10 grams of carbon black. To Surface No. 4 was applied water to which had been added 50 grams of Berol Lanco plus 10 grams of carbon black. Surface No. 5 received water to which had been added 100 grams of Berol Lanco plus 10 grams of carbon black.

Immediately after spraying, the depth of the snow was measured at three points on each surface, one point in the middle of the surface and the two others 20 meters from the center towards the opposite ends. Measurements were then taken at the same places on the dates noted in the table below, until all of the snow had melted on Apr. 27, 1961. The values reported in the table for each date are the average of the three measurements on each plot.

TABLE I

| Date | Mean depth of snow (cm.) | | | | |
| --- | --- | --- | --- | --- | --- |
| | Surface 1 | Surface 2 | Surface 3 | Surface 4 | Surface 5 |
| March 29 | 40.3 | 40.0 | 36.7 | 37.7 | 43.0 |
| April 15 | 39.0 | 33.7 | 30.7 | 33.3 | 39.0 |
| April 17 | 31.0 | 25.0 | 21.3 | 21.7 | 28.0 |
| April 21 | 19.7 | 10.3 | 11.3 | 5.0 | 13.3 |
| April 22 | 19.0 | 7.7 | 11.0 | 4.0 | 9.0 |
| April 23 | 14.0 | 1.7 | 7.7 | 0.7 | 4.0 |
| April 24 | 9.0 | 0 | 2.3 | 0 | 0 |
| April 25 | 6.3 | 0 | 0.7 | 0 | 0 |
| April 26 | 1.7 | 0 | 0 | 0 | 0 |
| April 27 | 0 | 0 | 0 | 0 | 0 |

As is clear from the table, the melting was consistently more rapid on the surfaces that had been sprayed with an aqueous solution containing a wetting agent, whether or not the solution also contained carbon black. The rate was greater when a wetting agent was used with the carbon black than with the carbon black alone. The differences between the solutions containing the wetting agent, with and without carbon black, are within the range of experimental error.

EXAMPLE 2

Three snow-covered surfaces in the form of squares measuring 2.5 by 2.5 meters each were marked out in the same area as those in Example 1. Each surface was sprayed as in Example 1 with 0.5 liter of liquid. Surface No. 6 was sprayed with a 0.4% aqueous solution of Berol Sulfanat (the water-soluble sodium salt of dodecyl benzene sulfonic acid), and anionic wetting agent, so that about 2 grams of the wetting agent were applied per square yard of snow surface. Surface No. 7 was treated with an equal amount of a 0.4% aqueous solution of the anionic wetting agent Teepol (sodium isooctyl sulfate). Surface No. 8 was treated with water. The temperatures of the aqueous solutions and water sprayed were the same, ±1° C. Measurements were taken of the mean depth of the snow at three points in the plots and the rate of thawing followed by taking measurements at the same spots on the dates given in Table II below. The values of the snow depth given in the table on each date represent the average of the three values.

TABLE II

| Date | Mean depth of snow (cm.) | | |
| --- | --- | --- | --- |
| | Surface 6 | Surface 7 | Surface 8 |
| April 21 | 45.6 | 50.8 | 53.4 |
| April 25 | 30.2 | 43.2 | 47.3 |
| April 26 | 26.3 | 36.9 | 42.6 |
| April 27 | 17.3 | 30.8 | 35.3 |
| April 28 | 12.3 | 24.8 | 30.7 |
| April 29 | 0.8 | 17.3 | 24.8 |
| April 30 | 0 | 12.6 | 22.2 |
| May 1 | 0 | 4.0 | 15.6 |
| May 2 | 0 | 0.3 | 11.1 |
| May 3 | 0 | 0 | 1.1 |
| May 4 | 0 | 0 | 0 |

It is evident that these anionic wetting agents also greatly accelerate the rate of melting of the snow. The effect of the sodium dodecyl benzene sulfonate was somewhat greater than that of the sodium isooctyl sulfate.

EXAMPLE 3

On March 28, four surfaces measuring 21 x 1.2 meters were marked out on flat ground in an open snow-covered field, the surfaces being spaced 5 meters from each other. These surfaces were sprayed as in Example 1, using 5 liters of liquid, three surfaces receiving aqueous solutions of water-soluble cationic wetting agents, and one surface receiving pure water. The spraying was carried out in an air temperaure of $-3°$ C., and the temperature of the liquid sprayed was $+4°$ C. in each case. Immediately after spraying, the depth of the snow was measured on each surface at ten points spaced two meters from each other. Subsequent measurements were taken at the same points. The depth of snow given in Table III which follows represents the mean of the ten values obtained in each measurement.

Measurements were taken on the dates given in the table. At the first measurement, the snow depth on two of the surfaces was 94 cms. and on the other two surfaces, 97 cms. Between March 30 and April 7 there was a fall of snow, so that all the sprayed surfaces were covered again with a layer of snow about 20 cms. deep. After April 7, no further snow fell on the surfaces during the experiment, and after this date thawing began, under strong sunshine from time to time. Further additions of wetting agents were not made after the first spraying, nor was artificial energy of any kind applied to the surfaces.

Surface No. 1, the control, was sprayed only with water. Surface No. 2 was sprayed with an aqueous solution containing five grams of cetyl pyridinium bromide. Surface No. 3 was sprayed with an aqueous solution containing 50 grams of the condensation product of ethylene oxide and coconut oil fatty amines, having a molecular weight of about 850. Surface No. 4 was sprayed with an aqueous solution containing 50 grams of the condensation of ethylene oxide and coconut oil fatty amines, having a molecular weight of about 850, and quaternized with dimethyl sulfate.

TABLE III

| Date | Mean depth of snow (cm.) | | | |
|---|---|---|---|---|
| | Surface 1 | Surface 2 | Surface 3 | Surface 4 |
| March 28 | 94.0 | 94.0 | 97.0 | 97.0 |
| March 30 | 94.0 | 94.0 | 96.0 | 96.0 |
| April 7 | 115.0 | 112.0 | 113.0 | 114.0 |
| April 21 | 75.0 | 53.0 | 63.0 | 63.0 |
| April 23 | 61.0 | 46.0 | 49.0 | 51.0 |
| April 25 | 53.0 | 32.0 | 38.0 | 39.0 |
| April 27 | 45.0 | 23.0 | 30.0 | 31.0 |
| April 29 | 41.0 | 15.0 | 24.0 | 24.0 |
| May 1 | 37.0 | 8.0 | 18.0 | 20.0 |
| May 2 | 32.0 | 3.0 | 16.0 | 15.0 |
| May 4 | 27.0 | 0 | 11.0 | 13.0 |
| May 5 | 23.0 | 0 | 3.0 | 6.0 |
| May 6 | 19.0 | 0 | 0 | 2.0 |
| May 7 | 16.0 | 0 | 0 | 0 |
| May 8 | 12.0 | 0 | 0 | 0 |
| May 9 | 5.0 | 0 | 0 | 0 |
| May 10 | 0 | 0 | 0 | 0 |

I claim:
1. A method of accelerating the melting of layers of snow or ice, which comprises causing the water formed by the natural melting of the snow or ice to penetrate the snow or ice more readily, by dissolving therein in situ as the water is formed a water-soluble organic wetting agent applied to the surface of the snow or ice in an amount of at least 0.01 gram per square yard of surface and selected from the group consisting of anionic, nonionic and cationic wetting agents, in the absence of other melt-accelerating agents, the anionic wetting agent being selected from the group consisting of alkyl aryl sulfonates having the structure:

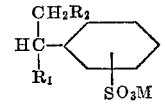

wherein M is selected from the group consisting of hydrogen, alkali metals, ammonium and organic amine cations, $R_1$ and $R_2$ are alkyl, and at least one R is polypropylene, the entire alkyl group containing from about twelve to about fifteen carbon atoms; keryl benzene sulfonates; dodecyl benzene sulfonates; amidoalkane sulfonates having the formula:

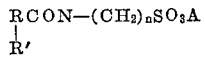

where A is selected from the group consisting of hydrogen, alkali metal or ammonium, $n$ is a small whole number from one to about five, R' is selected from the group consisting of hydrogen, alkyl, aryl, and cycloaliphatic groups, and R is selected from the group consisting of alkyl and alkylene; esters of sulfuric acid with aliphatic alcohols of from ten to eighteen carbon atoms; sulfonated fatty oils; esters and ethers of isothionic acid; long chain fatty acid esters and long chain alkyl ethers of 2,3-dihydroxypropane sulfonic acid; sulfuric acid esters of monoglycerides and glycerol monoethers; sulfated ethoxylated derivatives of alkyl oxyethers and esters and thioethers and esters having the general formula:

$$R-A(CH_2CH_2O)_xCH_2CH_2OSO_3M$$

where M is selected from the group consisting of hydrogen, alkali metals and organic amine cations, R is a saturated or unsaturated hydrocarbon group having from eight to eighteen carbon atoms, or an aralkyl group having a saturated or unsaturated hydrocarbon group having from eight to eighteen carbon atoms attached to the aryl nucleus, and attached to A through the aryl nucleus, A is selected from the group consisting of ethereal oxygen and sulfur, amino, carboxylic ester and thiocarboxylic ester groups, and $x$ is a number from eight to twenty; the nonionic wetting agent being selected from the group consisting of alkyl oxyethers and esters and thioethers and esters having the formula:

$$RA(CH_2CH_2O)_x-CH_2CH_2OH$$

where A is selected from the group consisting of ethereal oxygen and sulfur, amino, carboxylic ester, and thiocarboxylic ester groups, R is a saturated or unsaturated hydrocarbon group having from eight to eighteen carbon atoms or an aralkyl group having a saturated or unsaturated hydrocarbon group of from eight to eighteen carbon atoms attached to the aryl nucleus, and attached to A through the aryl nucleus, and $x$ is a number from eight to twenty; poly-1,2-alkyleneoxide wetting agents having the formula:

$$Y[(C_3H_6O)_n-E-H]_3$$

where E is a polyoxyalkylene chain wherein the oxygen/carbon atom ratio is at least 0.5, Y is the residue of an organic compound containing active hydrogen atoms, $n$ is an integer and $x$ is an integer greater than one, the values of $n$ and $x$ being such that the molecular weight of the compound exclusive of E is at least 900, as determined by hydroxyl number; and poly-1,2-alkyleneoxide wetting agents having the formula:

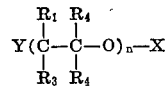

wherein Y is the residue of an organic compound containing a single hydrogen atom capable of reacting with a 1,2-alkylene oxide, $R_1$, $R_2$, $R_3$ and $R_4$ are selected from the group consisting of hydrogen, aliphatic and aromatic radicals, at least one such substituent being a radical other than hydrogen, $n$ is a number greater than 6.4, and X is a water-solubilizing group; and cationic wetting agents selected from the group consisting of the higher fatty acid esters of hydroxy amide quaternary salts; quaternary ammonium halides; sulfonated quaternary ammonium halides; sulfated quaternary ammonium halides; fatty amines having from eight to eighteen carbon atoms; polyamines made from the reduction of polymerized unsaturated fatty nitriles; quaternary compounds from alkyl halides and hexamethylene tetramine; the reaction products of alpha-halogenated fatty acid anilides or esters with tertiary amines; reaction products of long chain alkyl phenols with amines and aldehydes, wherein the alkyl group of the phenol has from six to eighteen carbon atoms; the aminoalkylene amines having the formula:

$$RCONHCH_2CH_2NR_1R_2$$

where R is an alkyl group having from six to eighteen carbon atoms, and $R_1$ and $R_2$ are alkyl or hydroxyalkyl groups of from one to five carbon atoms; the amidoalkylene quaternary ammonium salts having the formula:

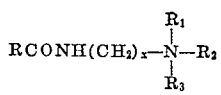

where R is an alkyl group having from six to eighteen carbon atoms, $R_1$, $R_2$ and $R_3$ are alkyl, aryl, or alkaryl, and $x$ is an anion; alkyl ether amines having the formula:

$$ROCH_2NR_1R_2$$

and their quaternary ammonium salts:

$$ROCH_2NR_1R_2R_3X$$

where R is an alkyl group of from six to eighteen carbon atoms, $R_1$, $R_2$ and $R_3$ are alkyl, aryl, or alkaryl, and X is an anion; the alkyl thioether amines:

$$RSCH_2NR_1R_2$$

and their quaternary ammonium salts:

$$RSCH_2NR_1R_2R_3X$$

where R is an alkyl group having from six to eighteen carbon atoms, $R_1$, $R_2$ and $R_3$ are alkyl, aryl, or alkaryl, and X is an anion; alkyl sulfonium compounds of the type:

$$R-R_1R_2SX$$

where R is an alkyl group having from six to eighteen carbon atoms, $R_1$ and $R_2$ are alkyl, aryl, or alkaryl, and X is an anion; amidosulfonium salts having the formula:

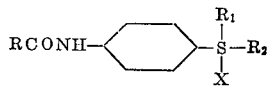

where R is an alkyl group having from six to eighteen carbon atoms, $R_1$ and $R_2$ are alkyl, aryl, or alkaryl, and X is an anion; and aminophosphonates having the formula:

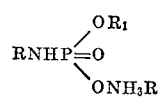

where R is an alkyl group having from six to eighteen carbon atoms, and $R_1$ is alkyl, aryl, or alkaryl.

2. A method in accordance with claim 1 in which the wetting agent is applied per se.

3. A method in accordance with claim 1 in which the wetting agent is applied in the form of an aqueous solution thereof.

4. A method in accordance with claim 1 in which said wetting agent is applied with carbon black.

References Cited

UNITED STATES PATENTS

| 3,310,494 | 3/1967 | Sproule et al. | 252—70 |
| 2,731,353 | 1/1956 | Fain | 252—70 XR |

FOREIGN PATENTS

| 569,466 | 1/1959 | Canada. |

LEON D. ROSDOL, *Primary Examiner.*

J. D. WELSH, *Assistant Examiner.*

UNITED STATES PATENT OFFICE
CERTIFICATE OF CORRECTION

Patent No. 3,412,030                                November 19, 1968

Nils Gösta Wahlberg

It is certified that error appears in the above identified patent and that said Letters Patent are hereby corrected as shown below:

Column 3, line 16, "vranched" should read -- branched --; line 65, "amomnium" should read -- ammonium --. Column 8, line 31, "R-A(CH$_2$CH$_2$O)$_x$CH$_2$CH$_2$OSO$_3$M" should read -- -R-A(CH$_2$CH$_2$O)$_x$CH$_2$CH$_2$OSO$_3$M --; lines 67 to 70, the formula should appear as shown below:

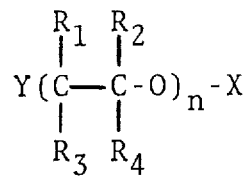

Signed and sealed this 10th day of March 1970.

(SEAL)
Attest:

EDWARD M. FLETCHER, JR.                          WILLIAM E. SCHUYLER, JR.
Attesting Officer                                        Commissioner of Patents